(12) United States Patent
Mizuno

(10) Patent No.: US 8,760,737 B2
(45) Date of Patent: Jun. 24, 2014

(54) IMAGE READING APPARATUS AND CONVEYANCE APPARATUS

(71) Applicant: Brother Kogyo Kabushiki Kaisha, Nagoya-shi, Aichi-ken (JP)

(72) Inventor: Masatsugu Mizuno, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/850,878

(22) Filed: Mar. 26, 2013

(65) Prior Publication Data

US 2014/0092451 A1 Apr. 3, 2014

(30) Foreign Application Priority Data

Sep. 28, 2012 (JP) ................................. 2012-216762

(51) Int. Cl.
*H04N 1/04* (2006.01)

(52) U.S. Cl.
USPC ........... 358/498; 358/474; 358/497; 399/107; 271/264

(58) Field of Classification Search
CPC ........... B65H 2220/02; B65H 2220/11; B65H 2220/01; B65H 2220/03; B65H 2511/20; B65H 2801/06; B65H 2511/10; B65H 2405/324; B65H 2511/30; B65H 2513/512; B65H 1/04; B65H 2301/4213; H04N 2201/045
USPC .......... 358/498, 474, 496, 488, 448; 271/264, 271/162; 399/107, 367
See application file for complete search history.

(56) References Cited

U.S. PATENT DOCUMENTS

| | | | | |
|---|---|---|---|---|
| 7,068,397 B2 * | 6/2006 | Sugano et al. | ................ | 358/409 |
| 7,651,287 B2 * | 1/2010 | Numata et al. | ........... | 400/120.01 |
| 7,748,706 B2 * | 7/2010 | Ishii | .............................. | 271/218 |
| 8,503,031 B2 * | 8/2013 | Kajihara et al. | ............... | 358/1.9 |
| 8,503,049 B2 * | 8/2013 | Kattou et al. | ................. | 358/498 |
| 8,542,415 B2 * | 9/2013 | Takeuchi et al. | ............. | 358/498 |
| 8,636,284 B2 * | 1/2014 | Nakayama | ............... | 271/265.04 |
| 8,657,284 B2 * | 2/2014 | Mizuno | ........................ | 271/264 |
| 2005/0057785 A1 | 3/2005 | Endo | | |
| 2008/0259414 A1 | 10/2008 | Kitagawa et al. | | |
| 2008/0285097 A1 | 11/2008 | Kitagawa et al. | | |
| 2012/0105925 A1 | 5/2012 | Shirai et al. | | |

FOREIGN PATENT DOCUMENTS

| | | | |
|---|---|---|---|
| JP | H09-284478 | A | 10/1997 |
| JP | 2005-051313 | A | 2/2005 |
| JP | 2008-270954 | A | 11/2008 |
| JP | 2008-285259 | A | 11/2008 |

(Continued)

*Primary Examiner* — Negussie Worku
(74) *Attorney, Agent, or Firm* — Merchant & Gould P.C.

(57) ABSTRACT

A conveyance apparatus including: a housing including, a first introduction opening to which a first medium is introduced, a first conveyance path through which the first medium is conveyed, a second introduction opening to which a second medium narrower than the first medium is introduced, and a second conveyance path through which the second medium is conveyed; a tray pivotally supported by the housing, rotating between an open position and a close position relative to the housing, and on which the first medium is placed; and a shutter being located at a first position when the tray is located at the open position and being located at a second position when the tray is located at the close position, the first position being located inside the second conveyance path and the second position being located outside the second conveyance path.

17 Claims, 13 Drawing Sheets

(56) References Cited

FOREIGN PATENT DOCUMENTS

| | | |
|---|---|---|
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |

* cited by examiner

IMAGE READING APPARATUS AND CONVEYANCE APPARATUS

CROSS-REFERENCE TO RELATED APPLICATIONS

This application claims priority from Japanese Patent Application No. 2012-216762 filed on Sep. 28, 2012, the entire contents of which are incorporated herein by reference.

TECHNICAL FIELD

The disclosure relates to an image reading apparatus and a conveyance apparatus.

BACKGROUND

In an image reading apparatus, for example, a backside of a housing is formed with an introduction opening for introducing therein a sheet. A front face side of the housing is formed with a discharge opening for discharging the sheet. In the housing, a conveyance path from the introduction opening to the discharge opening is formed. The image reading apparatus has an image reading unit and a pair of conveyance rollers. The pair of conveyance rollers is respectively provided at an introduction opening-side and a discharge opening-side of the image reading unit.

The sheet that is introduced from the introduction opening is conveyed on the conveyance path towards the discharge opening by the pair of conveyance rollers. During the conveyance, an image of the sheet is read by the image reading unit.

The image reading apparatus can also read an image formed on a card having a width that is narrower than that of the sheet. Specifically, a part of the discharge opening serves as both a card introduction opening for introducing the card and a card discharge opening for discharging the card. Also, a mechanism for rotating the pair of conveyance rollers in one direction and in the other direction is provided.

When the card is inserted into the card introduction opening, the pair of conveyance rollers is rotated in a direction reverse to a direction at the time of seat conveyance, so that the card is drawn into the card introduction opening by the pair of conveyance rollers. When the card passes through the image reading unit, the rotating direction of the pair of conveyance rollers is reversed, so that the pair of conveyance rollers is rotated in the same direction as the direction at the time of sheet conveyance. Thereby, the conveyance direction of the card is reversed, so that the card is conveyed towards the card discharge opening. During this conveyance, an image of the card is read by the image reading unit.

However, since the mechanism for rotating the pair of conveyance rollers in one direction and in the other direction is provided, a configuration of the driving system of the conveyance rollers is complicated.

In order to simplify the configuration of the driving system of the conveyance rollers, a configuration is considered in which the backside of the housing is formed with a dedicated card introduction opening for introducing a card, and the card introduced through the dedicated card introduction opening is conveyed towards a card discharge opening overlapping with at least a part of the discharge opening.

In a configuration where the sheet is conveyed from the sheet introduction opening towards the discharge opening in the front-lower direction, a sheet feeding tray that extends rearwards from the sheet introduction opening is provided, and the card introduction opening is positioned below the sheet feeding tray. Hence, it is difficult to introduce the card into the card introduction opening.

SUMMARY

Accordingly an object of the disclosure is to provide an image reading apparatus and a conveyance apparatus capable of easily introducing a second medium such as a card having a width narrower than that of a first medium such as a sheet into an introduction opening to which the second medium is configured to be introduced.

According to an aspect of the disclosure, there is provided an image reading apparatus including: a housing; a tray; a shutter; and a reading unit. The housing includes, a first introduction opening to which a first medium is configured to be introduced, a first conveyance path through which the first medium introduced from the first introduction opening is configured to be conveyed, a second introduction opening to which a second medium having a width narrower than that of the first medium is configured to be introduced, and a second conveyance path through which the second medium introduced from the second introduction opening is configured to be conveyed. The tray is pivotally supported by the housing, is configured to rotate between an open position and a close position relative to the housing, and the first medium is configured to be placed thereon. The shutter is provided in the housing movably between a first position and a second position. The shutter is located at the first position when the tray is located at the open position and is located at the second position when the tray is located at the close position. The first position is located inside the second conveyance path and the second position is located outside the second conveyance path. The reading unit is provided inside the housing and is configured to read an image from the first medium that is conveyed through the first conveyance path and an image from the second medium that is conveyed through the second conveyance path.

According to another aspect of the disclosure, there is provided a conveyance apparatus including: a housing; a tray; and a shutter. The housing includes, a first introduction opening to which a first medium is configured to be introduced, a first conveyance path through which the first medium introduced from the first introduction opening is configured to be conveyed, a second introduction opening to which a second medium having a width narrower than that of the first medium is configured to be introduced, and a second conveyance path through which the second medium introduced from the second introduction opening is configured to be conveyed. The tray is pivotally supported by the housing, is configured to rotate between an open position and a close position relative to the housing, and the first medium is configured to be placed thereon. The shutter is provided in the housing movably between a first position and a second position. The shutter being located at the first position when the tray is located at the open position and is located at the second position when the tray is located at the close position. The first position is located inside the second conveyance path and the second position is located outside the second conveyance path.

According to another aspect of the disclosure, there is provided an image reading apparatus including: a housing; a tray; an elastic member; a shutter; and a reading unit. The housing includes, a first introduction opening to which a first medium is configured to be introduced, a first conveyance path through which the first medium introduced from the first introduction opening is configured to be conveyed, a second introduction opening to which a second medium having a width narrower than that of the first medium is configured to be introduced, and a second conveyance path through which the second medium introduced from the second introduction opening is configured to be conveyed. The tray is configured to rotate between an open position and a close position relative to the housing. The tray includes a tray body configured to rotate about a tray shaft part extending in an axial direction, extending from the tray to an outside of the housing, and on which the first medium is configured to be placed, and a tray extension part extending from the tray to an inside of the housing. The shutter is provided to the housing so as to be rotatable about a shutter shaft part extending in the axial direction while being applied with an urging force by the elastic member in a direction along which the displacement part is displaced from the second position to the first position. The shutter includes, a contact part extending from the shutter shaft part extending in the axial direction, having a tip arranged within a rotating range of the tray extension part, and contacting with the tray when the tray is located at the close position, and a displacement part extending from the shutter shaft part, being located at a position overlapping with the second introduction opening in a conveyance direction of the second medium when the shutter is located at a first position, and being located at a position deviating from the second introduction opening in the conveyance direction of the second medium when the shutter is located at a second position. The reading unit is configured to read an image of the first medium that is conveyed through the first conveyance path and an image of the second medium that is conveyed through the second conveyance path.

DETAILED DESCRIPTION

Figure 1A:
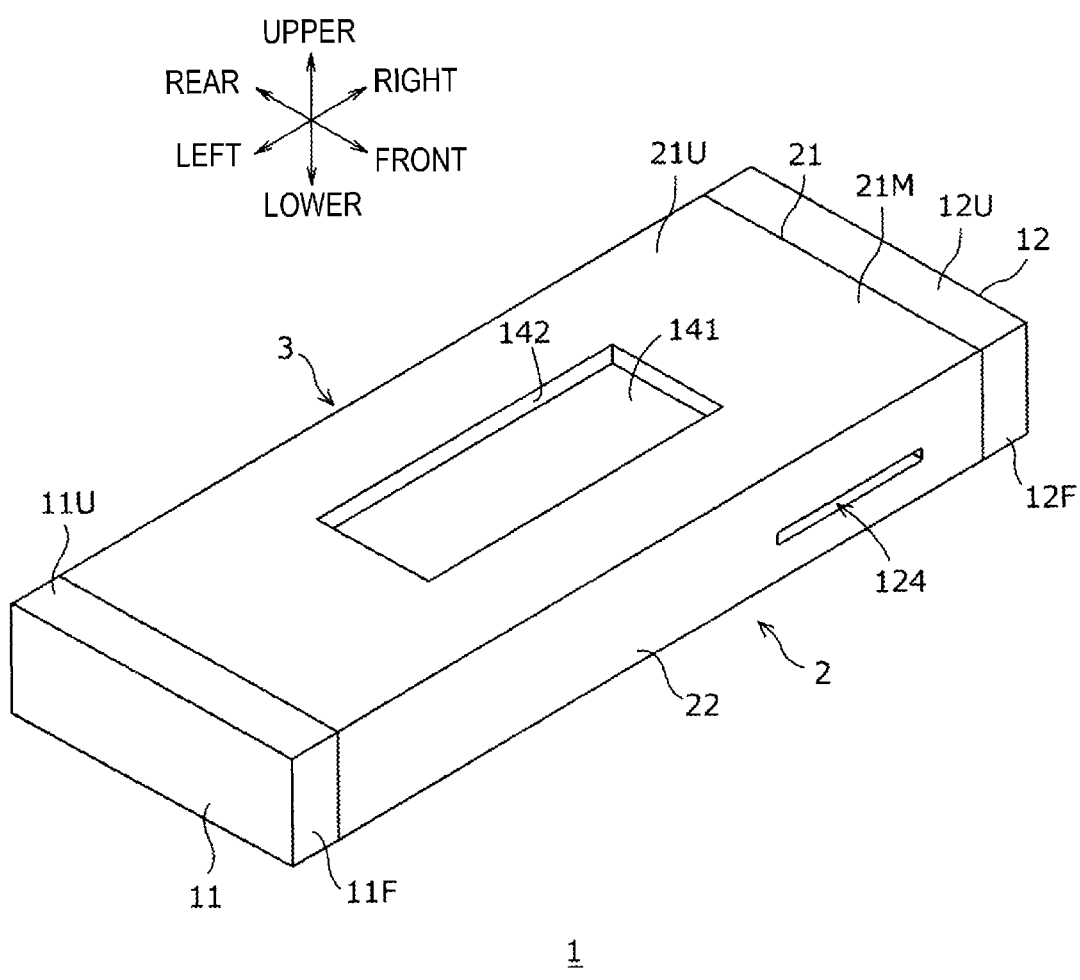
FIG. 1A is a perspective view of an image reading apparatus 1 according to an illustrative embodiment, which is seen from the upper of the left-front, showing a state where a cover 3 is closed.

Hereinafter, an illustrative embodiment of the disclosure will be specifically described with reference to the accompanying drawings. An image reading apparatus 1 is an example of a specific aspect of the image reading apparatus and the conveyance apparatus of the disclosure. In FIG. 1A, respective directions of front, rear, left, right, upper and lower are indicated by defining a front cover 22 side as the front side of the apparatus and a side that is located at a left side when facing the front cover 22 as a left side. The respective directions shown in FIGS. 1B to 10 are indicated in correspondence to the respective directions shown in FIG. 1A. Hereinafter, respective constitutional elements of the image reading apparatus 1 are described with reference to FIG. 1A and the like.

<External Appearance>

The image reading apparatus 1 has a housing 2 and a cover 3.

<Housing>

The housing 2 has a left side plate part 11, a right side plate part 12, a lower housing 13 and an upper housing 14.

The left side plate part 11 and the right side plate part 12 are arranged at an interval in the left-right direction.

The lower housing 13 and the upper housing 14 are arranged between the left side plate part 11 and the right side plate part 12.

The lower housing 13 is fixed to the left side plate part 11 and the right side plate part 12.

A left-front lower end portion and a right-front lower end portion of the upper housing 14 are formed with shaft parts, not shown, that protrude in the left-right direction, respectively. The left and right shaft parts are rotatably supported to the left side plate part 11 and the right side plate part 12, so that the upper housing 14 can rotate between a normal position shown in FIG. 2 and a maintenance position shown in FIG. 3.

Figure 2:
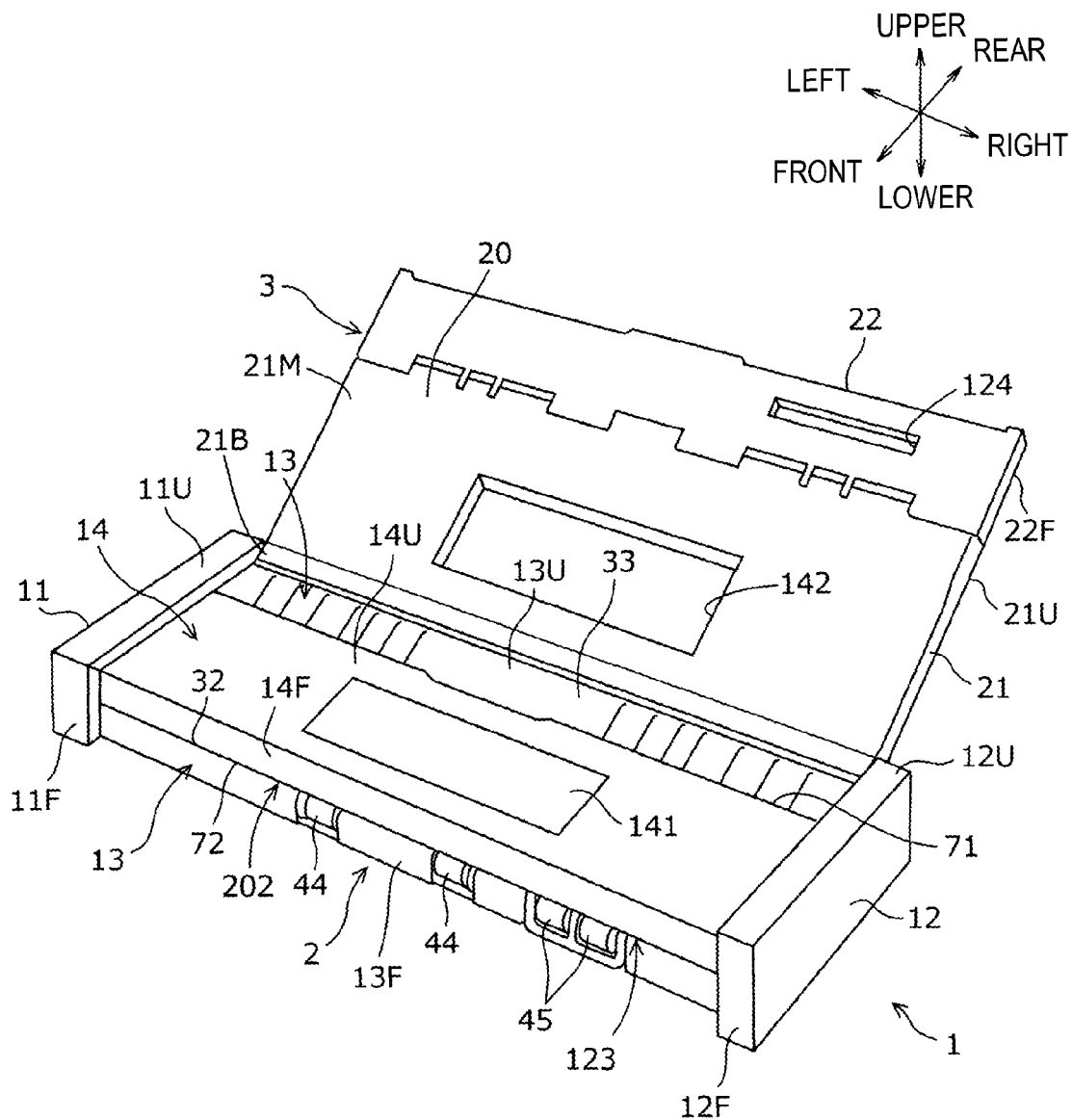
FIG. 2 is a perspective view of the image reading apparatus 1, which is seen from the right-upper, showing a state where the cover 3 is opened.

As shown in FIG. 2, at the normal position, the upper housing 14 overlaps with the lower housing 13 from the upper side. An upper surface 14U of the upper housing 14 that is located at the normal position is located at a position lower than respective upper surfaces 11U, 12U of the left side plate part 11 and the right side plate part 12 by one step. Also, a front side surface 14F of the upper housing 14 that is located at the normal position is located at a more rearward position than respective front side surfaces 11F, 12F of the left side plate part 11 and the right side plate part 12.

Also, the upper housing 14 develops forwards relative to the lower housing 13 at the maintenance position, so that it extends in the front-upper direction from the upper of a front end portion of the lower housing 13.

<Cover>

The cover 3 that is an example of the tray body has an upper cover 21 and a front cover 22.

Figure 4A:
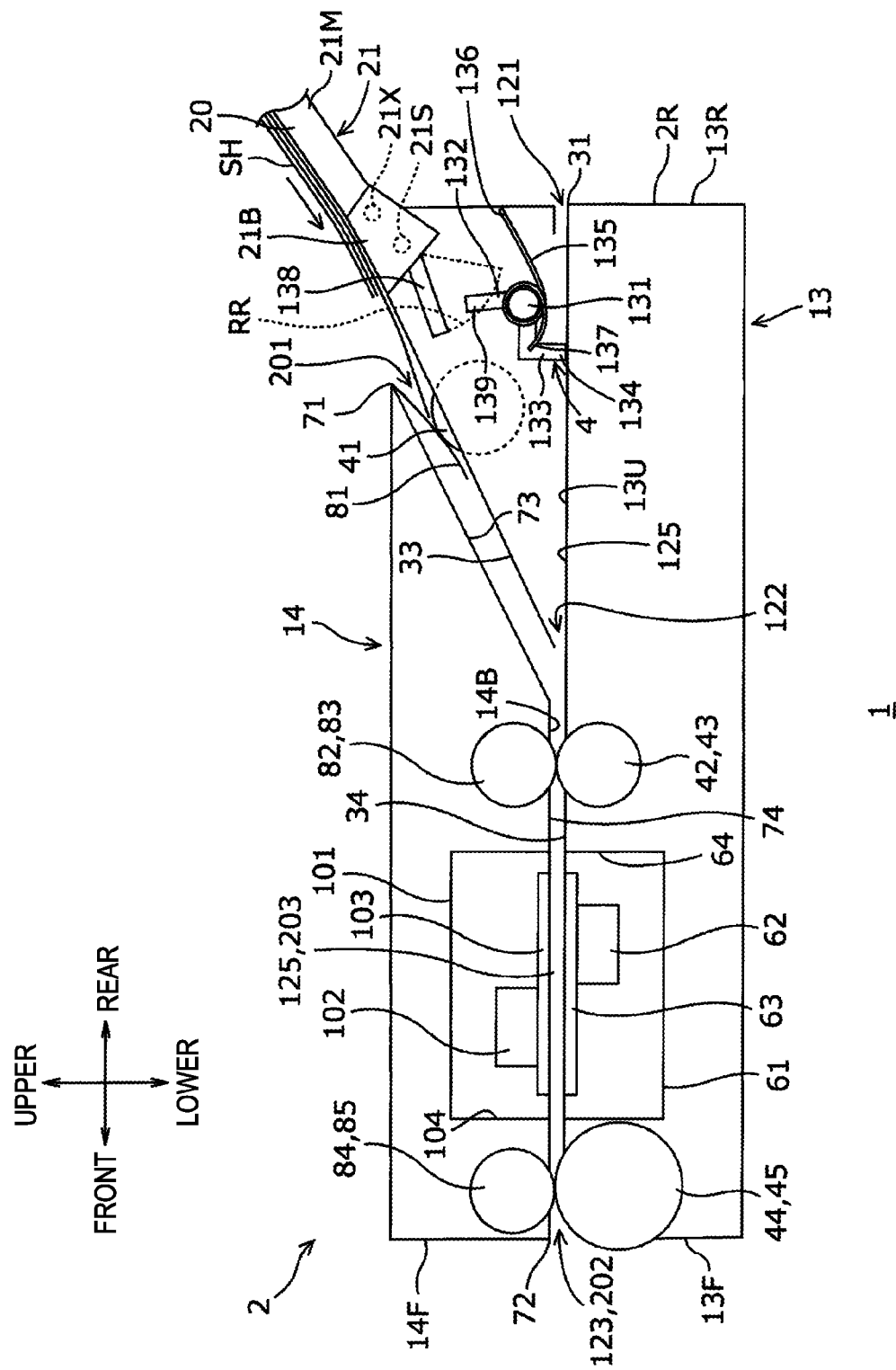
FIG. 4A is a sectional view of the image reading apparatus 1, showing a state where a shutter 4 is located at a restraint position.
Figure 4B:
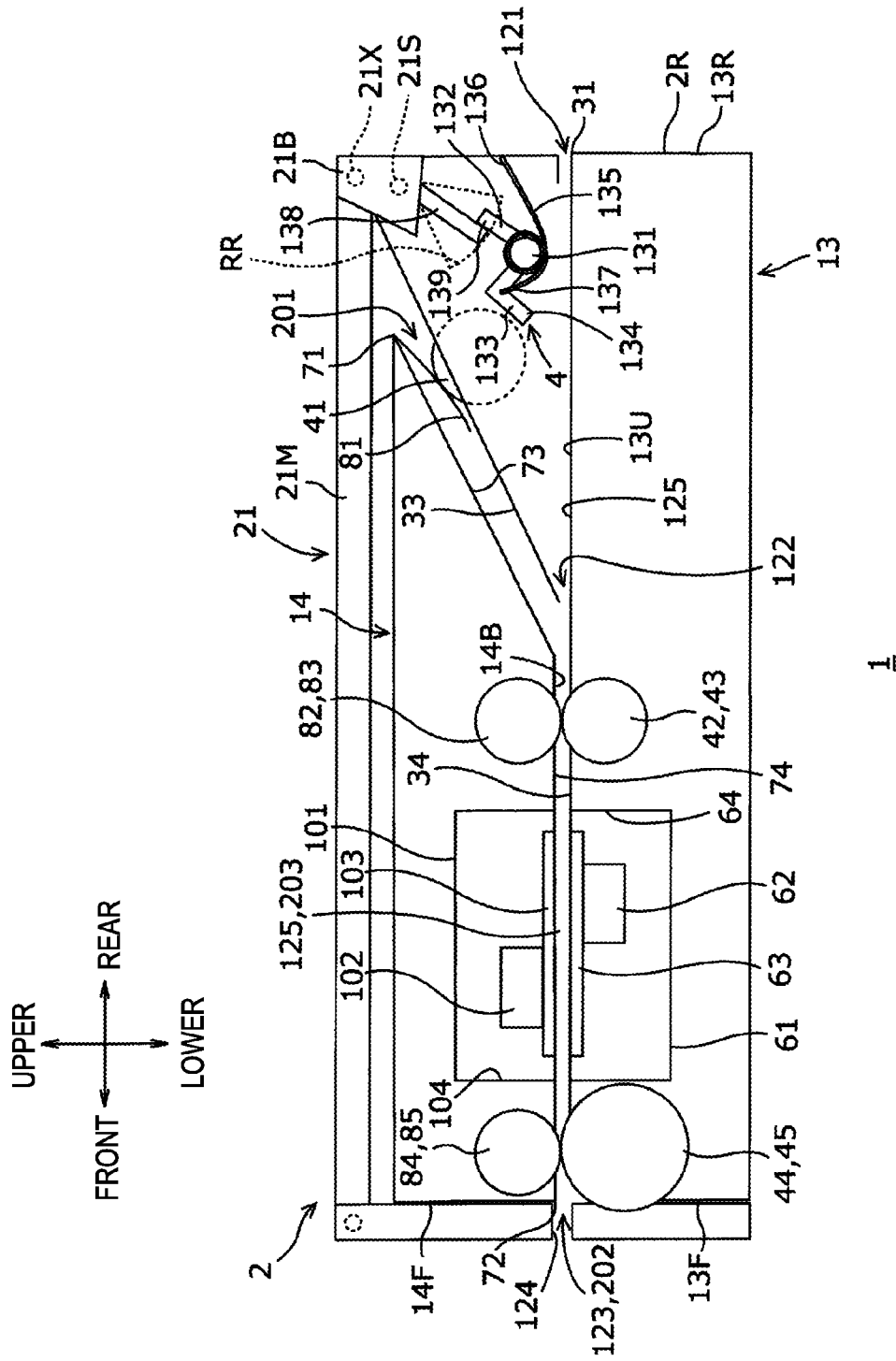
FIG. 4B is a sectional view of the image reading apparatus 1, showing a state where the shutter 4 is located at an allowed position.

As shown in FIGS. 4A and 4B, the upper cover 21 has a body part 21M and a base end part 21B. One end portion of the base end part 21B in a direction orthogonal to the left-right direction is connected to the body part 21M so that it can rotate about a shaft 21X. In the meantime, the other end portion of the base end part 21B is supported to rear-upper end portions of the left side plate part 11 and the right side plate part 12 of the housing 2 so that it can rotate about a tray shaft part 21S. Thereby, the upper cover 21 can be displaced between a close position shown in FIG. 1B and an open position shown in FIG. 2.

When the upper cover 21 is located at the close position, the base end part 21B stands upwards and the body part 21M overlaps with the lower housing 13 and the upper housing 14 from the upper side, as shown in FIG. 4B.

Also, when the upper cover 21 is located at the open position, the base end part 21B extends from a rear-upper end portion of the housing 2 in a rear-upper direction and the body part 21M extends in substantially parallel with the base end part 21B, as shown in FIG. 4A.

Figure 1B:
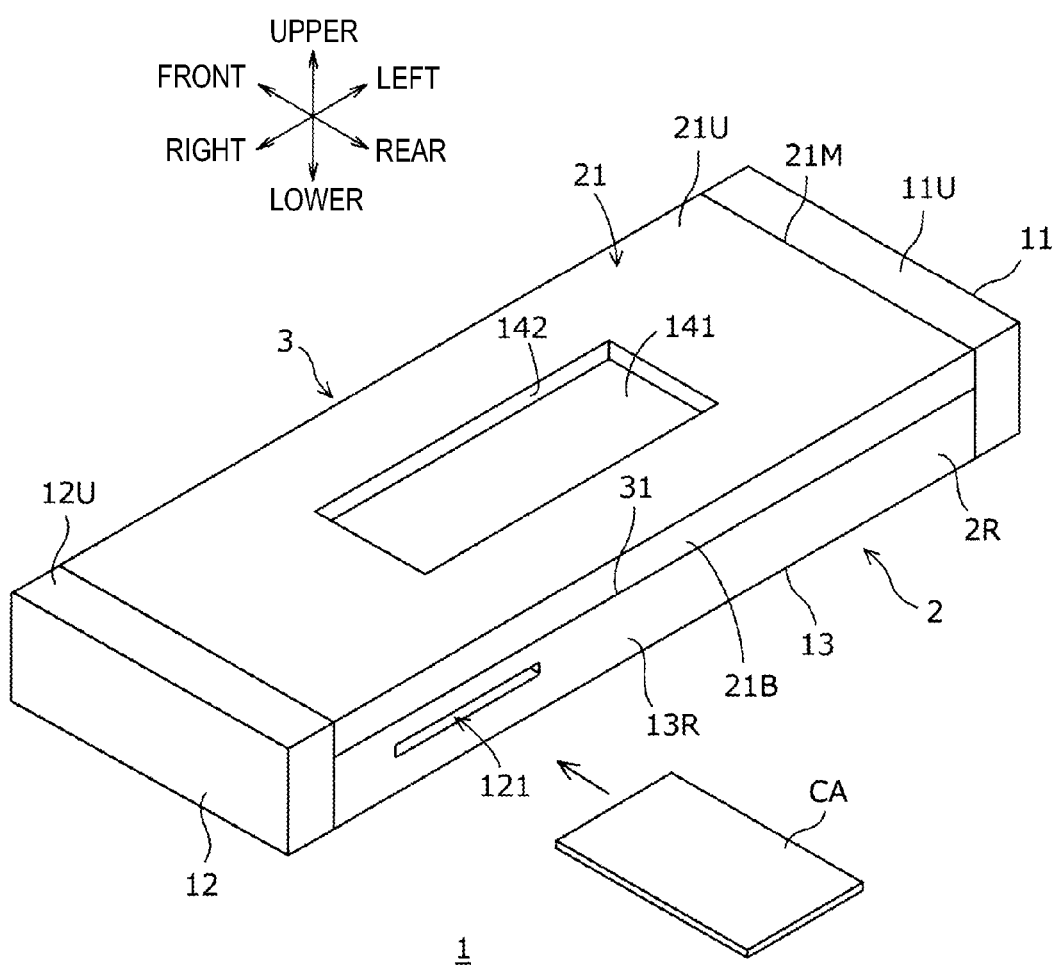
FIG. 1B is a perspective view of the image reading apparatus 1 according to an illustrative embodiment, which is seen from the upper of the right-rear, showing a state where the cover 3 is closed.

The front cover 22 is provided to rotate between a bent position shown in FIG. 1A and an extension position shown in FIG. 1B.

Also, the front cover 22 extends on the substantially same plane as the upper cover 21 at the extension position.

When the upper cover 21 is located at the open position and the front cover 22 is located at the extension position, the upper cover 21 and the front cover 22 extend from the rear-upper end portion of the housing 2 in the rear-upper direction, thereby forming an open position of a tray 20 on which a sheet SH, which is an example of the first medium to be fed into the housing 2, is put on. In the meantime, when the upper cover 21 is located at the close position and the front cover 22 is located at the bent position, the upper cover 21 and the front cover 22 form a close position of the tray 20.

Thereby, the image reading apparatus 1 has the tray 20 that is provided to rotate between the open position and the close position relative to the housing 2 and is configured to put the sheet SH thereon, which is an example of the first medium.

Figure 3:
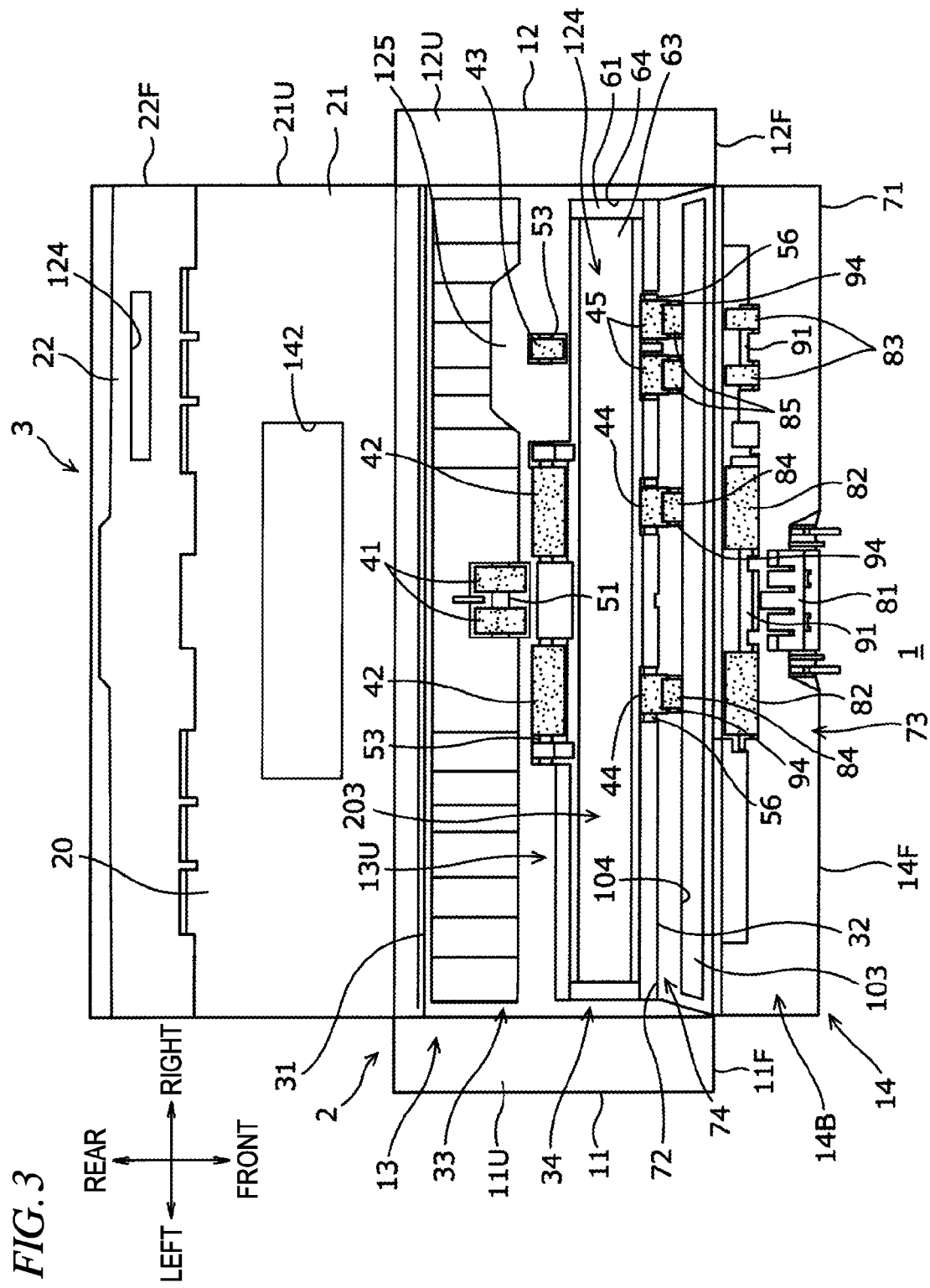
FIG. 3 is a plan view of the image reading apparatus 1 at a state where the cover 3 is opened and an upper housing 14 is arranged at a maintenance position.

A rear end edge 31 of the lower housing 13 is positioned at substantially a same height as a front end edge 32 of the lower housing 13. As shown in FIGS. 3, 4A and 4B, the lower housing 13 has an oblique part 33 and a flat part 34. The oblique part 33 extends from the rear end edge 31 to a position of the same height as the front end edge 32 in the front-lower direction. The flat part 34 extends from the oblique part 33 to the front end edge 32 at a position of the substantially same height as the front end edge 32.

As shown in FIG. 2, a rear end edge 71 of a lower surface 14B of the upper housing 14 is positioned at an interval above the oblique part 33 of the lower housing 13. A front end edge 72 of the lower surface 14B is positioned at an interval above the front end edge 32 of an upper surface 13U of the lower housing 13. As shown in FIGS. 3 and 4, the upper housing 14 has an oblique part 73 and a flat part 74. The oblique part 73 extends in parallel with the oblique part 33 from the rear end edge 71 to a position of the same height as the front end edge 72 in the front-lower direction. The flat part 34 extends in parallel with the flat part 34 of the lower housing 13 from the oblique part 73 to the front end edge 72 at a position of the same height as the front end edge 72.

A sheet introduction opening 201, a sheet discharge opening 202 and a sheet conveyance path 203 are formed between the upper housing 14 and the lower housing 13. The sheet introduction opening 201 is an example of the first introduction opening. The sheet discharge opening 202 is an example of the first medium discharge opening. The sheet conveyance path 203 is an example of the first conveyance path. The sheet introduction opening 201 is formed between the rear end edge 71 of the upper housing 14 and the oblique part 33 of the lower housing 13 and opens in the rear-upper direction. The sheet discharge opening 202 is formed between the front end edge 72 of the upper housing 14 and the front end edge 32 of the lower housing 13 and opens forwards. The sheet conveyance path 203 connects the sheet introduction opening 201 and the sheet discharge opening 202. The sheet conveyance path 203 is a space between the oblique part 73 of the upper housing 14 and the oblique part 33 of the lower housing 13 and between the flat part 74 of the upper housing 14 and the flat part 34 of the lower housing 13. The sheet SH introduced from the sheet introduction opening 201 passes through the sheet conveyance path 203 in the housing 2. Hereinafter, respective configurations of the image reading apparatus 1 are described in accordance with the flowing of the sheet SH.

The image reading apparatus 1 has supply rollers 41, a separation piece 81, LF rollers 42, LF pinch rollers 82, a card LD roller 43, card LF pinch rollers 83, a first reading unit 100, a second reading unit 60, discharge rollers 44, discharge pinch rollers 84, card discharge rollers 45 and card discharge pinch rollers 85.

As shown in FIG. 3, the supply rollers 41 have two rollers. The two rollers of the supply rollers 41 are attached to a rotary shaft 51. The supply rollers 41 are arranged at a central portion of the oblique part 33 in the left-right direction. The rotary shaft 51 extends in the left-right direction in the lower housing 13 and is rotatably held to the lower housing 13.

The separation piece 81 is made of rubber, for example. A base end portion of the separation piece 81 is attached to the upper housing 14. The separation piece 81 elastically abuts on circumferences of the supply rollers 41. The plurality of sheets SH can be separated and conveyed one by one by the separation piece 81 and the supply rollers 41. The sheet SH is conveyed forwards. Accordingly, in this illustrative embodiment, the front is a downstream side in a sheet conveyance direction and the rear is an upstream side in the sheet conveyance direction.

The LF rollers 42 and the LF pinch rollers 82 are positioned at the downstream side of the supply rollers 41 and the separation piece 81 in the sheet conveyance direction. The LF rollers 42 have two rollers. The two rollers of the LF rollers 42 are attached to a rotary shaft 53. The LF pinch rollers 82 have two pinch rollers. The two pinch rollers of the LF pinch rollers 82 are attached to a rotary shaft 91. As shown in FIG. 4, circumferences of the LF pinch rollers 42 abut on circumferences of the LF rollers 42 from the upper. When the LF rollers 42 rotate, the LF pinch rollers 82 are rotated in correspondence to the rotation of the LF rollers 42.

The card LF roller 43 is arranged at the right of the LF rollers 42 at an interval. The card LF roller 43 is attached to the rotary shaft 53 common to the LF rollers 42. The card LF pinch rollers 83 are arranged at the right of the LF pinch rollers 82 at an interval. As shown in FIG. 3, the card LF pinch rollers 83 have two pinch rollers. The two pinch rollers of the card LF pinch rollers 83 are attached to the rotary shaft 93. As shown in FIG. 4, circumferences of the two pinch rollers of the card LF pinch rollers 83 are adjacent to the left and right sides of the circumference of the card LF roller 43 of the lower housing 13, respectively.

Also, as shown in FIG. 4, the image reading apparatus 1 has the first reading unit 100 and the second reading unit 60 at the downstream side of the LF rollers 42 and the LF pinch rollers 82 in the sheet conveyance direction. The first reading unit 100 has a contact image sensor (hereinafter, referred to as 'CIS') holder 101, a CIS unit 102 and a contact glass 103. The second reading unit 60 has a CIS holder 61, a CIS unit 62 and a contact glass 63.

The CIS unit 62 that is an example of the reading unit is accommodated in the CIS holder 61. The CIS unit 62 is provided therein with an LED light source, a lens and an image sensor, for example. The CIS unit 102 that is an example of the reading unit is accommodated in the CIS holder 101. The CIS unit 102 is provided therein with an LED light source, a lens and an image sensor, for example.

The contact glass 63 is a colorless transparent glass. The contact glass 63 is provided to block an upper surface of the CIS holder 61 and is held to the CIS holder 61. The contact glass 103 is a colorless transparent glass. The contact glass 103 is provided to block a lower surface of the CIS holder 101 and is held to the CIS holder 101.

The CIS holder 61 is fitted into an opening 64, which is formed at the flat part 34 of the lower housing 13, while holding the CIS unit 62 and the contact glass 63. The CIS holder 101 is fitted into an opening 104, which is formed at the flat part 74 of the upper housing 14, while holding the CIS unit 102 and the contact glass 103.

Images of both sides of the sheet SH that is conveyed by the LF rollers 42 and the LF pinch rollers 82 are read by the first reading unit 100 and the second reading unit 60.

The discharge rollers 44 and the discharge pinch rollers 84 are positioned at the downstream side of the CIS unit 102 and the CIS unit 62 in the sheet conveyance direction. The discharge rollers 44 have two rollers. The two rollers of the discharge rollers 44 are attached to a rotary shaft 56. The discharge pinch rollers 84 have two pinch rollers. The two pinch rollers of the discharge pinch rollers 84 are attached to a rotary shaft 94. As shown in FIG. 4, circumferences of the discharge pinch rollers 84 abut on circumferences of the discharge rollers 44 from the upper. When the discharge rollers 44 rotate, the discharge pinch rollers 84 are rotated in correspondence to the rotation of the discharge rollers 44.

The card discharge rollers 45 and the card discharge pinch rollers 85 are positioned at the downstream side of the CIS unit 102 and the CIS unit 62 in the sheet conveyance direction. The card discharge rollers 45 have two rollers. The two rollers of the card discharge rollers 45 are attached to the rotary shaft 56. The card discharge pinch rollers 85 have two pinch rollers. The two pinch rollers of the card discharge pinch rollers 85 are attached to the rotary shaft 94. As shown in FIG. 4, circumferences of the card discharge pinch rollers 85 abut on circumferences of the card discharge rollers 45 from the upper. When the card discharge rollers 45 rotate, the card discharge pinch rollers 85 are rotated in correspondence to the rotation of the card discharge rollers 45.

<Reading of Sheet Images>

When reading images of the sheet SH in the image reading apparatus 1, the upper cover 21 is arranged at the open position and the front cover 22 is arranged at the extension position, as shown in FIGS. 2 and 4A. Then, the sheets SH are put on the tray 20 configured by the upper cover 21 and the front cover 22 at the open position.

The sheets SH put on the tray 20 are inserted into the sheet introduction opening 201 until tips thereof abut on the supply rollers 41 and the separation piece 81.

After that, the supply rollers 41 are rotated in a counterclockwise direction, when seen from the right. As the supply rollers 41 are rotated, a conveying force is applied from the circumferences of the supply rollers 41 to a lower surface of the sheet SH, so that the sheets SH are conveyed towards the LF rollers 42, 82. When the tips of the sheets SH are put between the supply rollers 41 and the separation piece 81, the sheets SH are separated one by one, so that only one sheet SH passes between the supply rollers 41 and the separation piece 81.

The LF rollers 42 and the card LF rollers 43 are rotated in the counterclockwise direction, when seen from the right. The LF pinch rollers 82 and the card LF pinch rollers 83 are rotated in the clockwise direction, when seen from the right. When the tip of the sheet SH having passed between the supply rollers 41 and the separation piece 81 reaches the LF rollers 42 and the card LF rollers 43, the conveying force is applied to the sheet SH by the LF rollers 42 and the card LF rollers 43.

The sheet SH having passed between the LF rollers 42 and the LF pinch rollers 82 and between the card LF rollers 43 and the card LF pinch rollers 83 passes on the contact glasses 63, 103. At this time, the lights emitted from the LED light sources of the CIS units 62, 102 are illuminated to the sheet SH on the contact glasses 63, 103. The lights reflected on the sheet SH are received by the image sensors of the CIS units 62, 102, so that images on both sides of the sheet SH are read.

The discharge rollers 44 and the card discharge rollers 45 are rotated in the counterclockwise direction, when seen from the right. The discharge pinch rollers 84 and the card discharge pinch rollers 85 are rotated in the clockwise direction, when seen from the right. When the tip of the sheet SH having passed on the contact glasses 63, 103 reaches the discharge rollers 44 and the card discharge rollers 45, the conveying force is applied to the sheet SH from the discharge rollers 44 and the card discharge rollers 45.

The sheet SH conveyed between the discharge rollers 44 and the discharge pinch rollers 84 and between the card discharge rollers 45 and the card discharge pinch rollers 85 passes through the sheet discharge opening 202 and is then discharged to the outside of the housing 2.

<Reading of Card Images>

The image reading apparatus 1 can read images formed on a card CA having a width narrower than that of the sheet SH.

As shown in FIG. 1B, the lower housing 13 is formed with a card introduction opening 121 that is an example of the second introduction opening, so as to read images of the card CA. The card introduction opening 121 is formed at a position on a rear surface 13R of the lower housing 13 overlapping with the card LF rollers 43, 83 in the front-rear direction. The card introduction opening 121 has a rectangular shape extending in the left-right direction. A width of the card introduction opening 121 in the left-right direction is slightly larger than a length of a short side of a card size (53.98 mm) of the international standard ID-1 defined by the International Standardization Organization (ISO)/International Electrotechnical Commission (IEC) and is smaller than a length of a long side of the card size (85.60 mm).

A card conveyance path 125 that is an example of the second conveyance path is formed between the flat part 34 of the upper surface 13U of the lower housing 13 and the flat part 74 of the lower surface 14B of the upper housing 14 and below the oblique part 33 of the upper surface 13U of the lower housing 13. The card conveyance path 125 is a space that is formed between the flat part 34 of the upper surface 13U of the lower housing 13 and the flat part 74 of the lower surface 14B of the upper housing 14 and below the oblique part 33 of the upper surface 13U of the lower housing 13.

As described above, the rear end edge 31 of the lower housing 133 is positioned at substantially a same height as the front end edge 32 of the lower housing 13. The card conveyance path 125 extends from the rear end edge 31 towards the front end edge 32. Therefore, a conveyance direction of the card CA is substantially horizontal at a state where the image reading apparatus 1 is placed on a horizontal surface.

As shown in FIGS. 3, 4A and 4B, a card passing opening 122 is formed at a right-lower end portion of the oblique part 33 of the lower housing 13, specifically at a part of the oblique part 33 overlapping with the card introduction opening 121 in the front-rear direction. The card passing opening 122 is formed between a front-lower end portion of the oblique part 33 of the lower housing 13 and the flat part 34. The card passing opening 122 connects a space between the flat part 34 and the flat part 74 and a space below the oblique part 33. Therefore, the card CA having passed through the card passing opening 122 can move from the space below the oblique part 33 to the space between the flat part 34 and the flat part 74.

Figure 10:
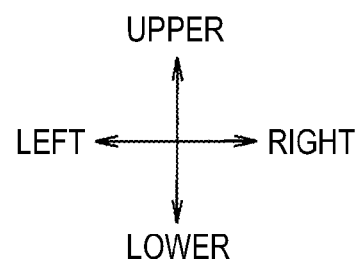
FIG. 10 schematically illustrates that a sheet discharge opening 202 and a card discharge opening 123 overlap with each other at least partially.
Figure 10:
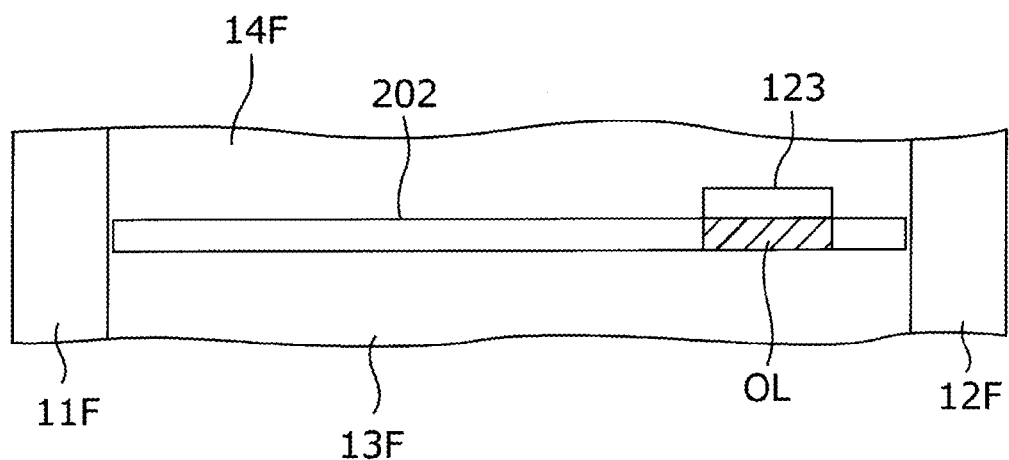

As shown in FIG. 10, a card discharge opening 123 is formed at a part of the sheet discharge opening 202 overlapping with the card discharge rollers 45 and the card discharge pinch rollers 85 in the front-rear direction. The card discharge opening 123 is formed between the front end edge 72 of the upper housing 14 and the front end edge 32 of the lower housing 13 and is opened forwards. A part of a lower side of the card discharge opening 123 overlaps with a part of a right side of the sheet discharge opening 202. That is, both the sheet SH and the card CA can pass the overlapping area OL. At the state where the tray 20 is located at the close position (refer to FIG. 1A), the sheet discharge opening 202 is blocked by the tray 20, except for the area overlapping with the card discharge opening 123. The front cover 22 is formed with a tray-side discharge opening 124 at a position at which the tray-side discharge opening 124 overlaps with the card discharge opening 123 in the front-rear direction, which is an example of the housing-side discharge opening, at a state where the tray 20 is located at the close position. Therefore, as shown in FIG. 4B, the tray-side discharge opening 124 is positioned at the front of the card discharge opening 123 at the state where the tray 20 is located at the close position. The tray-side discharge opening 124 has a substantially rectangular shape having a size which is the same as or larger than that of the card discharge opening 123. Hence, the card discharge opening 123 is not blocked by the tray 20 at the state where the tray 20 is located at the close position.

When reading images of the card CA, the card CA is inserted into the card introduction opening 121 with a short side thereof being headed at the state where the tray 20 having the upper cover 21 and the front cover 22 is located at the close position. A tip of the inserted card CA passes through the card passing opening 122 and reaches between the card LF roller 43 and the card LF pinch rollers 83. The card CA inserted into the card introduction opening 121 is conveyed through the card conveyance path 125, as follows.

The card LF roller 43 is rotated in the counterclockwise direction, when seen from the right. The card LF pinch rollers 83 is rotated in the clockwise direction, when seen from the right, as the card LF roller 43 is rotated. When the tip of the card CA inserted into the card introduction opening 121 abuts on the circumferences of the card LF roller 43 and the card LF pinch rollers 83, the conveying force is applied to the card CA from the card LF roller 43, so that the card CA is drawn between the circumferences of the card LF roller 43 and the card LF pinch rollers 83.

After that, the card CA passes between the first reading unit 100 and the second reading unit 60. At this time, the lights emitted from the LED light sources of the CIS units 62, 102 are illuminated to the card CA on the contact glasses 63, 103.

The lights reflected on the card CA are received by the image sensors of the CIS units 62, 102, so that images on both sides of the card CA are read.

The card discharge rollers 45 are rotated in the counterclockwise direction, when seen from the right. On the other hand, the card discharge pinch rollers 85 are rotated in the clockwise direction, when seen from the right, as the card discharge rollers 45 are rotated. When the tip of the card CA having passed between the first reading unit 100 and the second reading unit 60 abuts on the circumferences of the card discharge rollers 45, the conveying force is applied to the card CA from the card discharge rollers 45, so that the card CA is drawn between the circumferences of the card discharge rollers 45 and the card discharge pinch rollers 85.

At the state where the tray 20 is located at the close position and the card CA is discharged from the card discharge opening 123, the tray-side discharge opening 124 is positioned at the front of the card discharge opening 123, as shown in FIG. 4B. Therefore, the card CA having passed through the card discharge opening 123 passes through the tray-side discharge opening 124 and is then discharged to the outside of the housing 2. By doing so, the card CA passes through the card discharge opening 123 and the tray-side discharge opening 124 and is then discharged to the outside of the housing 2.

In other words, the card introduction opening 121 that is an example of the second introduction opening is formed on the rear surface 2R of the housing 2 with respect to the card LF roller 43 and the card LF pinch rollers 83, which are an example of the second conveyance roller. The rotating axis of the tray 20 is orthogonal to the front-rear direction and is located at the rear of the housing 2 in the front-rear direction with regard to the LF rollers 42 and the LF pinch rollers 82, which are an example of the first conveyance roller. The front side surface of the housing 2 is formed with the card discharge opening 123 that is an example of the housing-side discharge opening for discharging the card CA introduced from the card introduction opening 121. The sheet discharge opening 202 overlaps with a part of the card discharge opening 123 in the left-right direction that is an axial direction of the rotating axis of the tray 20.

<Shutter>

The image reading apparatus 1 has a shutter 4.

The shutter 4 is provided at the right-rear end portion of the upper housing 14 so that it can rotate about a shutter shaft part 131 extending in the left-right direction. The shutter 4 has an abutting part 132 and a displacement part 133.

The abutting part 132 extends from the shutter shaft part 131 in a direction orthogonal to the shutter shaft part 131.

The displacement part 133 extends from the shutter shaft part 131 in a direction orthogonal to the shutter shaft part 131 and intersecting with the abutting part 132. The displacement part 133 is bent by about 90 degrees on the way of the extension thereof.

The shutter 4 is provided to rotate between a restraint position shown in FIG. 4A and an allowed position shown in FIG. 4B. At a state where the shutter 4 is located at the restraint position, a tip 134 of the displacement part 133 overlaps with the card introduction opening 121 in the front-rear direction between the card introduction opening 121 and the card passing opening 122. At a state where the shutter 4 is located at the allowed position, the tip 134 of the displacement part 133 is deviated upwards from the overlapping position with the card introduction opening 121 in the front-rear direction.

Also, the image reading apparatus 1 has a coil spring 135 that is an example of the urging member.

The coil spring 135 is wound on the shutter shaft part 131. One end portion 136 of the coil spring 135 is attached to the upper housing 14. The other end portion 137 of the coil spring 135 is attached to the displacement part 133. The shutter 4 is urged from the allowed position towards the restraint position by an elastic force of the coil spring 135.

That is, the image reading apparatus 1 has the coil spring 135 that is an example of the urging member urging the shutter 4 from the allowed position towards the restraint position.

The upper cover 21 that configures a part of the tray 20 has a tray extension part 138. The tray extension part 138 extends from the base end part 21B of the upper cover 21 towards the shutter 4. As the base end part 21B of the upper cover 21 is rotated, the tray extension part 138 rotates about the tray shaft part 21S. The tip 139 of the abutting part 132 is arranged in a rotating range RR of the tray extension part 138.

That is, the image reading apparatus 1 has the tray 20 that includes the upper cover 21, which is an example of the tray body that is provided to rotate about the tray shaft part 21S extending in the left-right direction serving as an example of the axial direction, extends from the tray shaft part 21S to the outside of the housing 2 and to which the sheet SH serving as an example of the first medium is placed, and the tray extension part 138 extending from the tray shaft part 21S into the housing 2 and that is provided to rotate between the open position and the close position relative to the housing 2. Here, the open position may be a position at which the tray 20 exposes the housing 2, and the close position at which the tray 20 covers the housing 2.

At the state where the tray 20 is located at the open position, the tray extension part 138 extends in the front-lower direction of the tray shaft part 21S and is spaced upwards from the abutting part 132 of the shutter 4, as shown in FIG. 4A. At this state, the shutter 4 is located at the restraint position and the tip 134 of the displacement part 133 overlaps with the card introduction opening 121 in the front-rear direction. Therefore, the card CA is restrained from being introduced from the card introduction opening 121.

When the tray 20 is rotated from the open position to the close position, the base end part 21B of the upper cover 21 and the tray extension part 138 are correspondingly rotated about the tray shaft part 21S. Since the tip 139 of the abutting part 132 of the shutter 4 is arranged within the rotating range RR of the tray extension part 138, the tray extension part 138 abuts on the tip 139 during the rotation. When the tray extension part 138 is further rotated after the tray extension part 138 abuts on the tip 139 of the abutting part 132, a pressing force is applied from the tray extension part 138 to the tip 139 of the abutting part 132. By this pressing force, the shutter 4 is rotated about the shutter shaft part 131 against the elastic force of the coil spring 135. As a result, the tip 134 of the displacement part 133 is lifted up and the shutter 4 is displaced to the allowed position.

Also, when the tray 20 is rotated from the close position to the open position, the base end part 21B of the upper cover 21 and the tray extension part 138 are correspondingly rotated about the tray shaft part 21S. The tray extension part 138 is spaced from the tip 139 of the abutting part 132 of the shutter 4 in the course of the rotation. When the tray extension part 138 is spaced from the tip 139 of the abutting part 132, the shutter 4 is rotated about the shutter shaft part 131 by the elastic force of the coil spring 135. As a result, the tip 134 of the displacement part 133 is moved downwards and the shutter 4 is located at the restraint position.

That is, the image reading apparatus 1 has the shutter 4 that, when the tray 20 is located at the open position, is located at the restraint position and thus restrains the card CA, which is an example of the second medium, from being introduced into the card introduction opening 121, which is an example of the second introduction opening, and that, when the tray 20 is located at the close position, is located at the allowed position and thus allows the card CA to be introduced into the card introduction opening 121. The shutter 4 is provided to the housing 2 so that it can be rotated about the shutter shaft part 131 extending in the left-right direction serving as an example of the axial direction. While the tray 20 is rotated from the open position to the close position, the abutting part 132 is pressed by the tray 20, so that the shutter 4 is moved from the restraint position to the allowed position against the urging force of the coil spring 135 that is an example of the urging member. While the tray 20 is rotated from the close position to the open position, the tray 20 is spaced from the abutting part 132, so that the shutter 4 is moved from the allowed position to the restraint position by the urging force of the coil spring 135. The abutting part 132 extends from the shutter shaft part 131 and the tip 139 thereof is arranged in the rotating range RR of the tray extension part 138.

In other words, the image reading apparatus 1 has the shutter 4 that includes: the abutting part 132 which extends from the shutter shaft part 131 extending in the left-right direction serving as an example of the axial direction, has the tip arranged within the rotating range RR of the tray extension part 138 and abuts on the tray 20 when the tray 20 is located at the close position; and the displacement part 133 which extends from the shutter shaft part 131, is located at the position at which the displacement part 133 overlaps with the card introduction opening 121 serving as an example of the second introduction opening in the front-rear direction that is the conveyance direction of the card CA serving as an example of the second medium when the shutter 4 is located at the restraint position serving as an example of the first position, and is located at the position at which the displacement part 133 deviates from the card introduction opening 121 in the front-rear direction when the shutter 4 is located at the allowed position serving as an example of the second position. Further, the shutter 4 is provided to the housing 2 so that the shutter can be rotated about the shutter shaft part 131 extending in the left-right direction while it is applied with the urging force by the coil spring 135 serving as an example of the elastic member in the direction along which the displacement part 133 is displaced from the allowed position to the restraint position.

<Display Instrument>

The image reading apparatus 1 has a display instrument 141 that is an example of the display operation unit and the display unit.

As shown in FIG. 2, the display instrument 141 is arranged to the upper surface 14U of the upper housing 14. The display instrument 141 is a liquid crystal display instrument having a touch panel. The body part 21M of the upper housing 14 is formed with a rectangular opening 142 having the substantially same size as an outward form of the display instrument 141 at a position at which the rectangular opening 142 overlaps with the display instrument 141 in the upper-lower direction when the upper cover 21 is located at the close position. Thereby, it is possible to see the display instrument 141 in any of the state where the upper cover 21 is located at the open position and the state where the upper cover 21 is located at the close position.

<Electrical Configuration>

Figure 5:
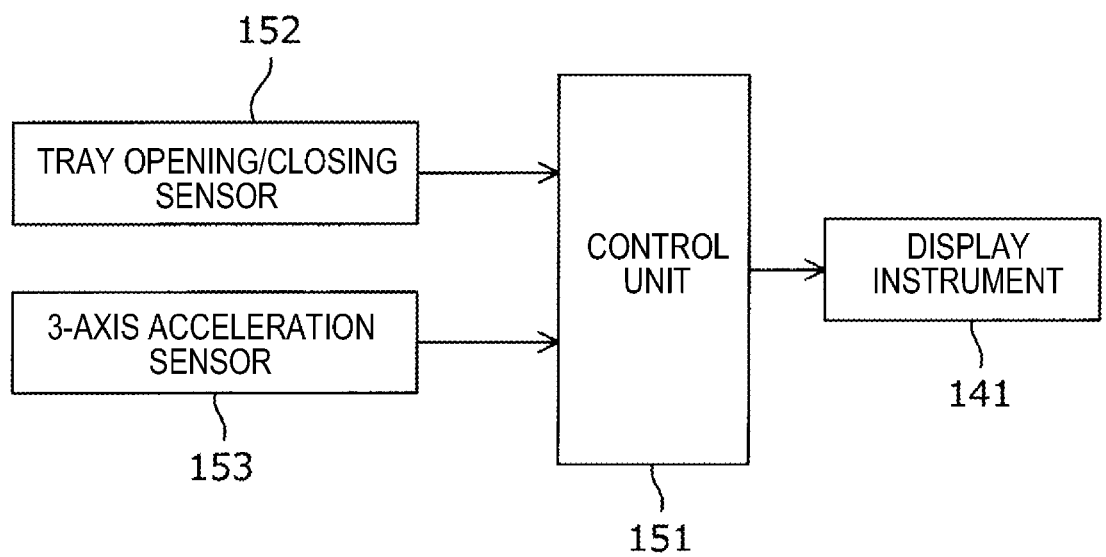
FIG. 5 is a block diagram showing main parts of an electrical configuration of the image reading apparatus 1.

As shown in FIG. 5, the image reading apparatus 1 has a control unit 151 that includes a microcomputer and is an example of the display control unit.

Also, the image reading apparatus 1 has a tray opening/closing sensor 152 that detects whether the tray 20 is opened or closed. The tray opening/closing sensor 152 includes a micro switch. When the tray 20 is located at the close position, an on signal is output from the tray opening/closing sensor 152. On the other hand, when the tray 20 is located at the open position, an off signal is output from the tray opening/closing sensor 152.

Further, the image reading apparatus 1 has a 3-axis acceleration sensor 153 so as to detect a direction of the image reading apparatus 1.

The signals that are output from the tray opening/closing sensor 152 and the 3-axis acceleration sensor 153 are input into the control unit 151. The control unit 151 controls a display control circuit (not shown), based on the output signals of the tray opening/closing sensor 152 and the 3-axis acceleration sensor 153, thereby changing a direction of an image that is displayed on the display instrument 141.

<Display Switching Control>

Figure 6:
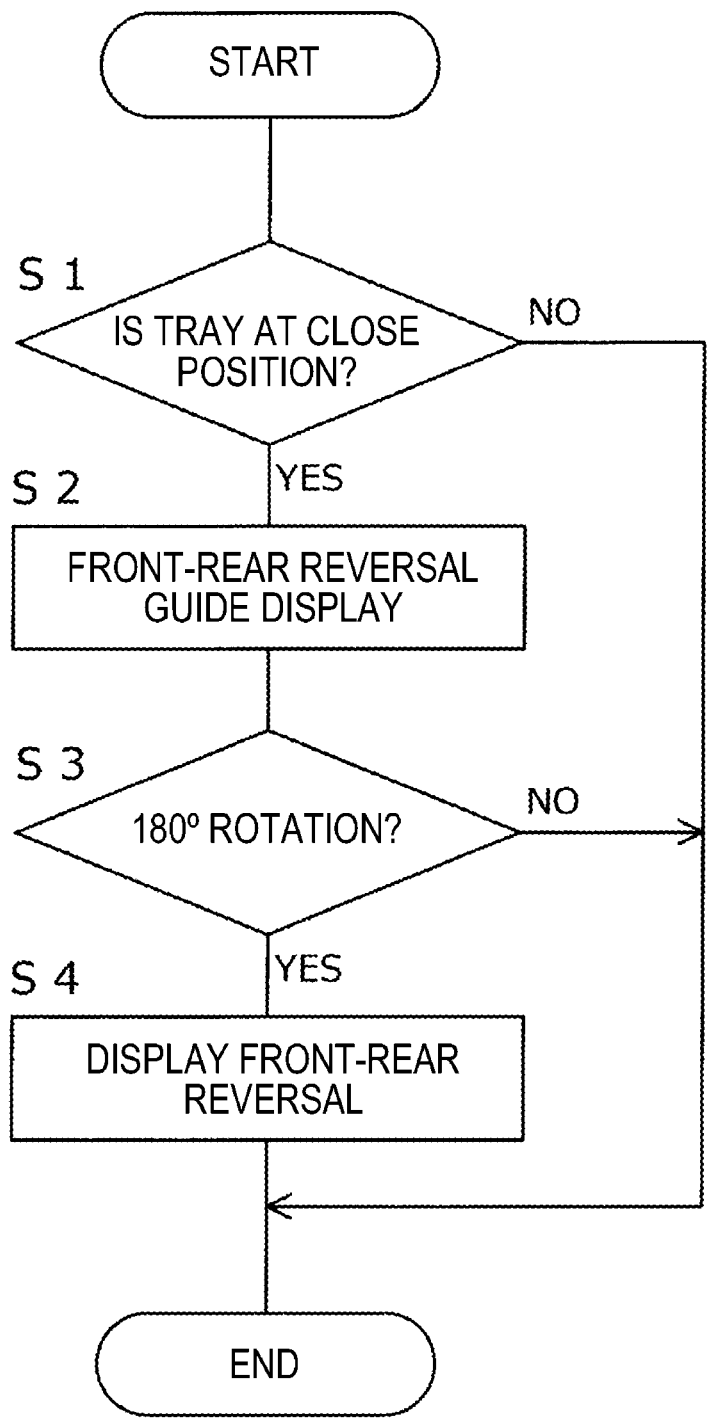
FIG. 6 is a flowchart showing display switching control.

While a power supply of the image reading apparatus 1 is ON, the control unit 151 repeats display switching control shown in FIG. 6.

In the display switching control, it is first determined whether the tray 20 is rotated from the open position to the close position (step S1). Specifically, it is checked whether the output signal of the tray opening/closing sensor 152 is switched from the off signal to the on signal.

When the tray 20 is still located at the open position (No in step S1), the display switching control ends.

When the tray 20 is rotated from the open position to the close position, a front-rear reversal guide display, which is a display urging a user to rotate the image reading apparatus 1 by 180 degrees so that the rear surface 2R of the housing 2 faces forwards, is displayed on the display instrument 141 (refer to FIG. 9A) (step S2).

After that, it is determined whether the image reading apparatus 1 is rotated by 180 degrees (step S3).

When the image reading apparatus 1 is rotated (YES in step S3), the front-rear reversal guide display on the display instrument 141 disappears and a predetermined normal display is displayed on the display instrument 141 in a direction that is reversed to the direction of the front-rear reversal guide display by 180 degrees (step S4).

<Effects>

As described above, the housing 2 is formed with the sheet introduction opening 201, the sheet conveyance path 203, the card introduction opening 121 and the card conveyance path 125. The sheet SH is introduced into the sheet introduction opening 201. The sheet SH introduced from the sheet introduction opening 201 is conveyed through the sheet conveyance path 203. The card CA having a width narrower than that of the sheet SH is introduced into the card introduction opening 121. The card CA introduced from the card introduction opening 121 is conveyed through the card conveyance path 125. While the sheet SH and the card CA are respectively conveyed through the sheet conveyance path 203 and the card conveyance path 125, the images of the sheet SH and the card CA are read by the CIS units 62, 102. That is, when the sheet SH is conveyed, the images of the sheet SH are read by the CIS units 62, 102. When the card CA is conveyed, the images of the card CA are read by the CIS units 62, 102.

The tray 20 is provided to rotate between the open position and the close position relative to the housing 2. The sheet SH is put on the tray 20.

When the tray 20 is located at the open position, the shutter 4 is located at the restraint position, thereby restraining the card CA from being introduced into the card introduction opening 121. When the tray 20 is located at the close position, the shutter 4 is located at the allowed position, thereby allowing the card CA to be introduced into the card introduction opening 121.

Thereby, when the card CA is introduced into the card introduction opening 121, the tray 20 is arranged at the close position. Therefore, the tray 20 does not interfere with the introduction of the card CA into the card introduction opening 121. As a result, it is possible to easily introduce the card CA into the card introduction opening 121.

In a configuration where the card CA can be introduced from the card introduction opening 121 at the state where the tray 20 is opened, a user cannot determine a state at which it is possible to read the card CA. As a result, the user may introduce the card CA into the card introduction opening 121 at the state where the tray 20 is opened. However, in this illustrative embodiment, the shutter 4 suppresses the card CA from being introduced into the card introduction opening 121 at the state where the tray 20 is opened. Therefore, it is possible to enable the user to more easily recognize that the card CA can be read at the state where the tray 20 is closed and the sheet SH can be read at the state where the tray 20 is opened.

The image reading apparatus 1 has the coil spring 135 that urges the shutter 4 from the allowed position towards the restraint position.

As the coil spring 135 urges the shutter 4, the shutter 4 is moved from the allowed position to the restraint position. Hence, even when the tray 20 is moved from the close position to the open position with the card CA being introduced into the card introduction opening 121, it is possible to suppress the shutter 4 from strongly abutting on the card CA, compared to a configuration where the opening/closing operation of the tray 20 is directly converted into the moving of the shutter 4. As a result, it is possible to suppress the card CA from being damaged due to the shutter 4.

The shutter 4 has the abutting part 132. The abutting part 132 abuts on the tray 20 at least when the tray 20 is located at the close position.

As the tray 20 abuts on the abutting part 132, it is possible to move the shutter 4 from the restraint position to the allowed position against the urging force of the coil spring 135.

Specifically, while the tray 20 is rotated from the open position to the close position, the abutting part 132 is pressed by the tray 20 and the shutter 4 is moved from the restraint position to the allowed position against the urging force of the coil spring 135. Also, while the tray 20 is rotated from the close position to the open position, the tray 20 is spaced from the abutting part 132 and the shutter 4 is moved from the allowed position to the restraint position by the urging force of the coil spring 135.

Thereby, as the tray 20 is moved between the open position and the close position, the shutter 4 can be moved between the restraint position and the allowed position. Therefore, it is possible to move the shutter 4 by opening/closing the tray 20 without separately providing a member such as switch for moving the shutter 4 other than the tray 20.

The tray 20 has the cover 3 that rotates about the tray shaft part 21S extending in the axial direction and extends from the tray shaft part 21S to the outside of the housing 2 and the tray extension part 138 that extends from the tray shaft part 21S to the inside of the housing.

The shutter 4 is provided to the housing so as to be rotatable about the shutter shaft part 131 extending in the axial direction, the abutting part 132 extends from the shutter shaft part 131, and the tip of the abutting part is arranged within the rotating range RR of the tray extension part 138.

While the tray 20 is rotated from the open position to the close position, it is possible to enable the tray extension part 138 to securely abut on the tip of the abutting part 132. Hence, as the tray 20 is moved from the open position to the close position, it is possible to favorably move the shutter 4 from the restraint position to the allowed position.

Also, when the tray 20 is located at the close position, the area of the sheet discharge opening 202 other than the area overlapping with the card discharge opening 123 is blocked by the tray 20. The tray 20 is formed with the tray-side discharge opening 124 at the position at which the tray-side discharge opening 124 overlaps with the card discharge opening 123 in the front-rear direction when the tray 20 is located at the close position. Hence, when the tray 20 is located at the close position, it is possible to suppress the tray 20 from interfering with the discharge of the card CA from the card discharge opening 123. Therefore, it is possible to favorably discharge the card CA to the outside of the housing 2.

<Other Display Switching Control>

Figure 7:
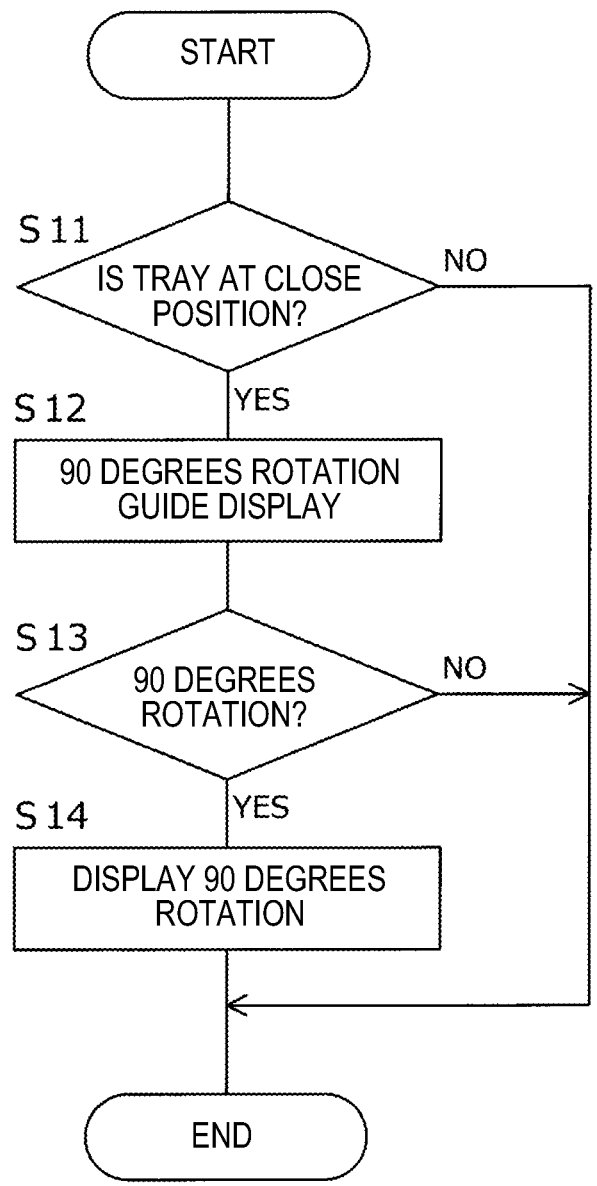
FIG. 7 is a flowchart showing another display switching control.

The control unit 151 may execute display switching control shown in FIG. 7, instead of the switching control shown in FIG. 6.

In the switching control shown in FIG. 7, it is first determined whether the tray 20 is rotated from the open position to the close position (step S11). Specifically, it is checked whether the output signal of the tray opening/closing sensor 152 is switched from the off signal to the on signal.

When the tray 20 is still located at the open position (NO in step S11), the display switching control ends.

When the tray 20 is rotated from the open position to the close position, a 90 degrees rotation guide display, which is a display encouraging a user to rotate the image reading apparatus 1 by 90 degrees so that the rear surface 2R of the housing 2 faces rightwards, is displayed on the display instrument 141 (refer to FIG. 9B) (step S12).

After that, it is determined whether the image reading apparatus 1 is rotated by 90 degrees (step S13).

When the image reading apparatus 1 is rotated by 90 degrees (YES in step S13), the 90 degrees rotation guide display on the display instrument 141 disappears and a predetermined normal display is displayed on the display instrument 141 in a direction that is rotated from the direction of the 90 degrees rotation guide display by 90 degrees (step S14).

According to the above configuration, the display direction of the display instrument 141 is rotated depending on the direction of the image reading apparatus 1. Specifically, when the image reading apparatus 1 is rotated by 90 degrees, the display direction of the display instrument 141 is rotated by 90 degrees. Hence, it is possible to favorably read a display on the display instrument 141 in any direction of the image reading apparatus 1.

<Other Configuration for Rotating Shutter>

Figure 8A:
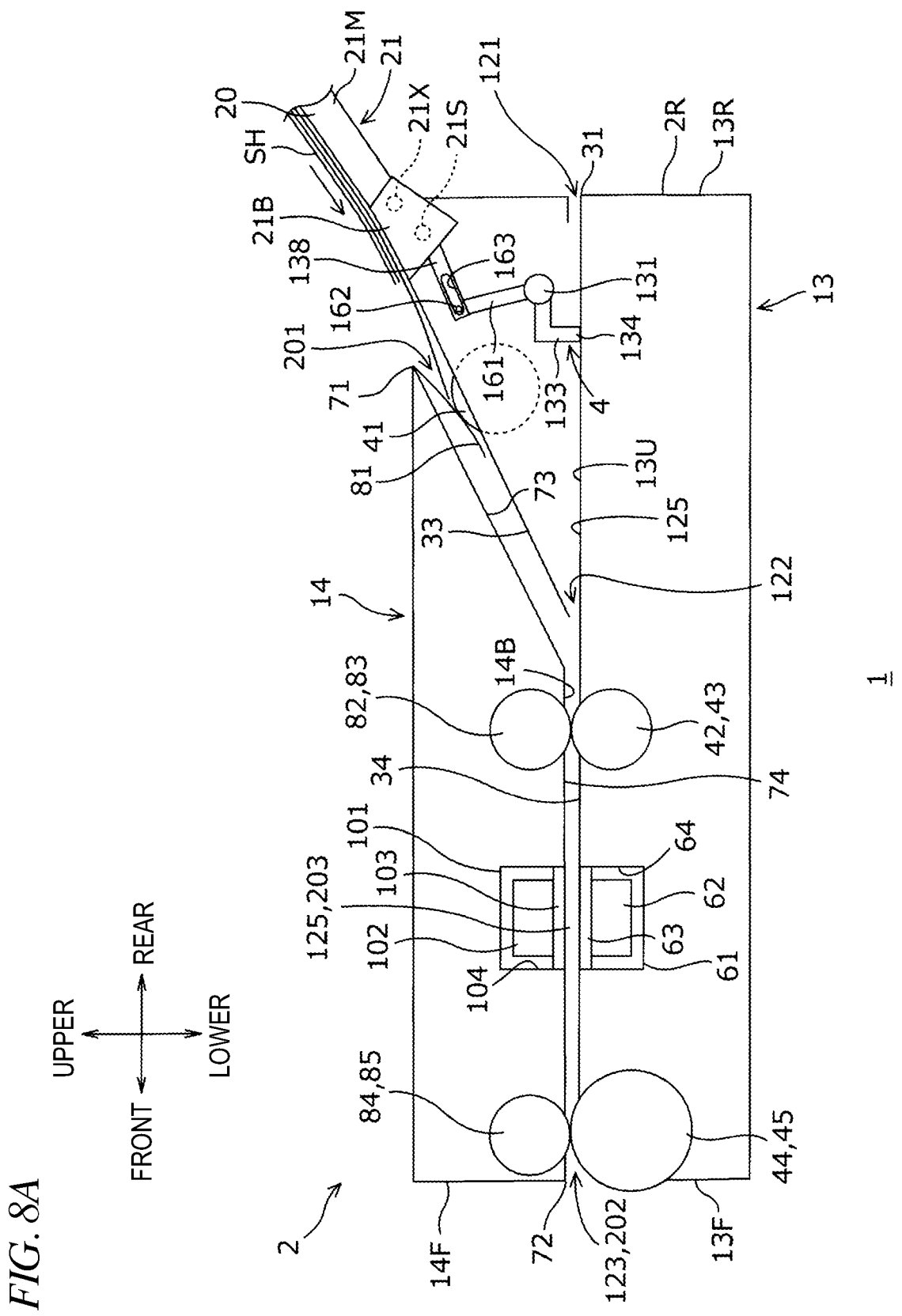
FIG. 8A is a sectional view of the image reading apparatus 1 in which another configuration for rotating the shutter 4 is adopted, showing a state where the shutter 4 is located at the restraint position.
Figure 8B:
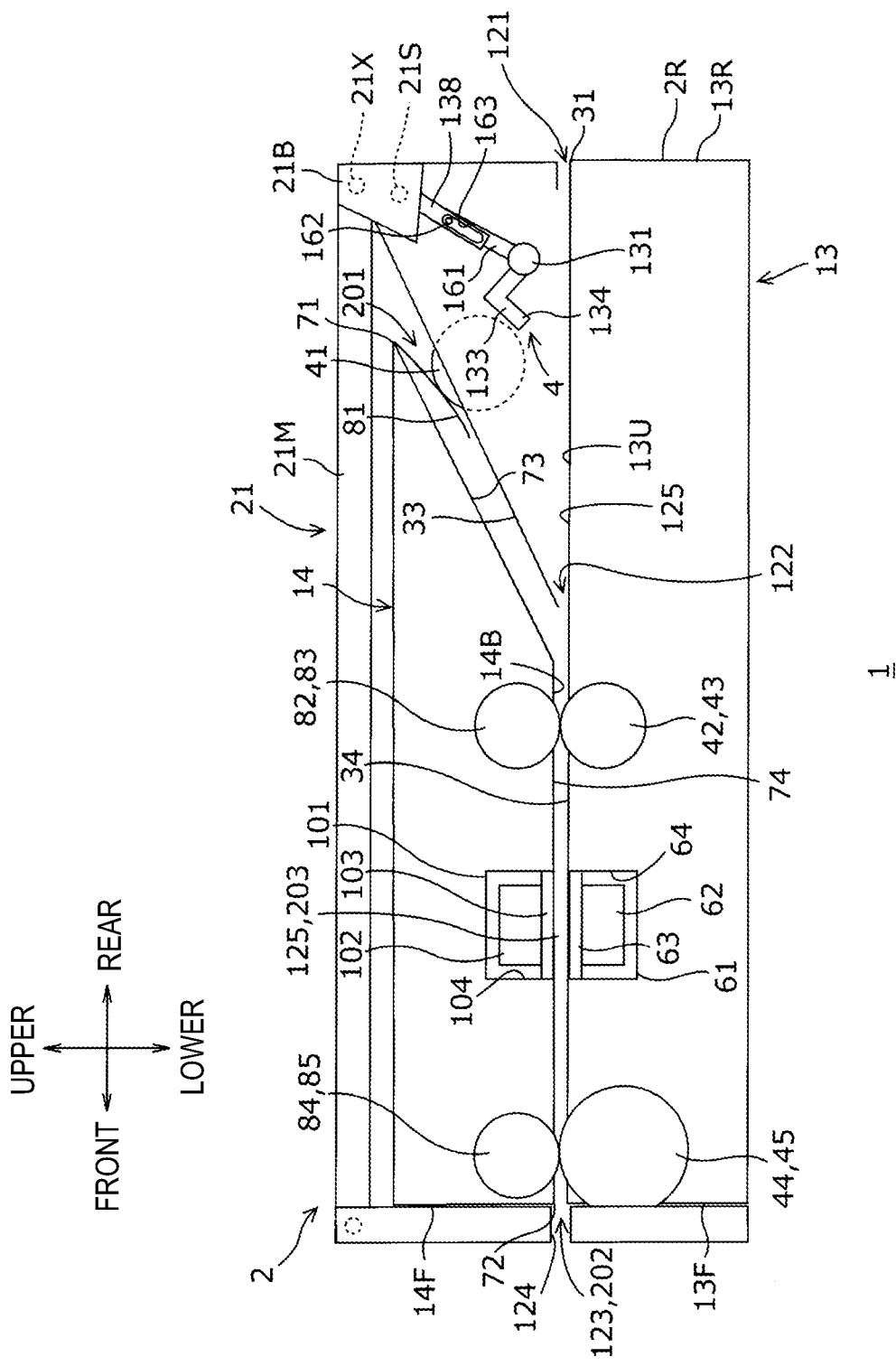
FIG. 8B is a sectional view of the image reading apparatus 1 in which another configuration for rotating the shutter 4 is adopted, showing a state where the shutter 4 is located at the allowed position.
Figure 9A:
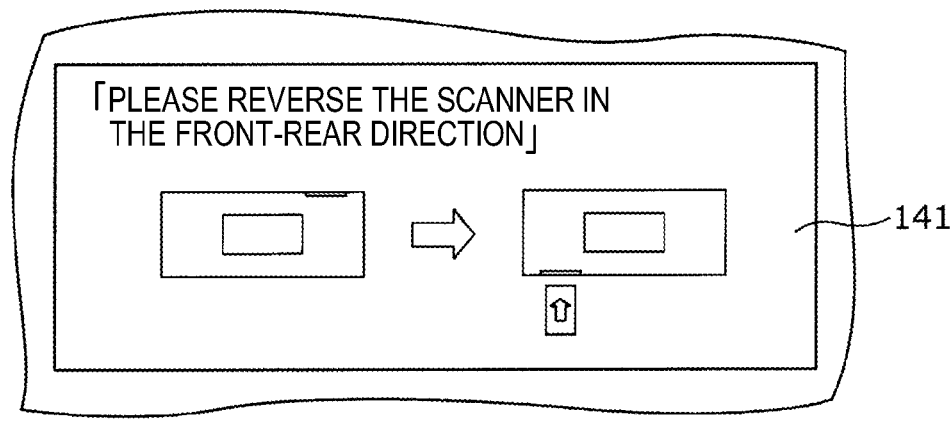
FIG. 9A shows the image reading apparatus 1 at a state where a front-rear reversal guide display is displayed on an display instrument 141, and shows a plan view near by the display instrument 141.
Figure 9B:
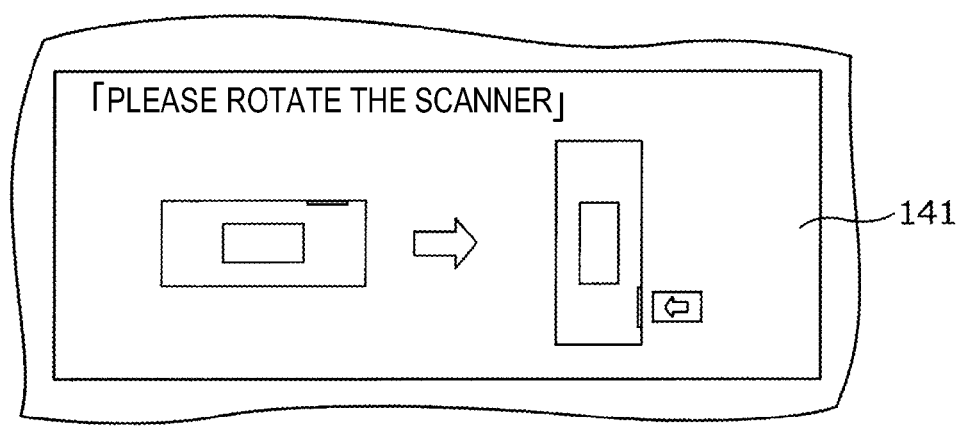
FIG. 9B shows the image reading apparatus 1 at a state where a 90 degrees rotation guide display is displayed on the display instrument 141, and shows a plan view near by the display instrument 141.

In order to rotate the shutter 4 between the restraint position and the allowed position, a configuration shown in FIGS. 8A and 8B may be adopted, instead of the configuration shown in FIGS. 4A and 4B.

In the configuration shown in FIGS. 8A and 8B, the tray extension part 138 is formed with a long hole 163 that elongates in an extension direction of the tray extension part 138 and penetrates the tray extension part 138 in the left-right direction. The shutter 4 includes a shutter extension part 161 that is provided to the housing 2 so that it can be rotated about the shutter shaft part 131 extending in the left-right direction and extends from the shutter shaft part 131, and a connection shaft part 162 that protrudes from the shutter extension part 161 in the left-right direction and is inserted into the long hole 163.

Hereinafter, the above configuration is specifically described.

The shutter 4 has the shutter extension part 161 that extends from the shutter shaft part 131 and the connection shaft part 162 that protrudes from a tip of the shutter extension part 161 in the left-right direction. The connection shaft part 162 is inserted into the long hole 163 that is formed to the tray extension part 138. The long hole 163 penetrates the tray extension part 138 in the left-right direction.

When the tray 20 is rotated from the open position to the close position, the base end part 21B of the upper cover 21 and the tray extension part 138 are correspondingly rotated about the tray shaft part 21S. As the tray extension part 138 is rotated, the connection shaft part 162 is moved within the long hole 163. As the connection shaft part 162 is moved, the shutter extension part 161 is rotated about the shutter shaft part 131. As a result, as shown in FIG. 8B, the tip 134 of the displacement part 133 is lifted up and the shutter 4 is thus located at the allowed position.

Also, when the tray 20 is rotated from the close position to the open position, the base end part 21B of the upper cover 21 and the tray extension part 138 are correspondingly rotated about the tray shaft part 21S. As the tray extension part 138 is rotated, the connection shaft part 162 is moved within the long hole 163. As the connection shaft part 162 is moved, the shutter extension part 161 is rotated about the shutter shaft part 131. As a result, as shown in FIG. 8A, the tip 134 of the displacement part 133 is moved downwards and the shutter 4 is thus located at the restraint position.

In the configuration shown in FIGS. 8A and 8B, it is possible to rotate the shutter 4 between the restraint position and the allowed position without using the coil spring 135.

In the configuration shown in FIGS. 8A and 8B, the tray extension part 138 is formed with a long hole 163 and the shutter 4 includes the connection shaft part that is inserted into the long hole 163. However, the invention is not limited thereto. As an alternative, the shutter may include a hole and the tray extension part may include a shaft part that is inserted into the hole of the shutter.

Modified Embodiments

Although the illustrative embodiment of the disclosure has been described, the disclosure can be also implemented by the other embodiments.

For example, the image reading apparatus 1 has the 3-axis acceleration sensor 153. Instead of this, the image reading apparatus 1 may be provided with a motion sensor to thus detect a user position relative to the image reading apparatus 1, so that the display screen on the display instrument 141 may be displayed in a direction along which the user can easily see the display screen. Also, the image reading apparatus 1 may be provided with both the 3-axis acceleration sensor 153 and the motion sensor.

In the above illustrative embodiment, the card discharge opening 123 is formed as the part of the sheet discharge opening 202 overlapping with the discharge rollers 45 and the card discharge pinch rollers 85 in the front-rear direction. At the state where the tray 20 is located at the close position, the sheet discharge opening 202 is blocked by the tray 20, except for the area overlapping with the card discharge opening 123. In this case, the card CA introduced from the card introduction opening 121 is conveyed rearwards through the card conveyance path 125 and is then discharged through the card discharge opening 123.

However, the disclosure is not limited thereto. For example, the card introduction opening 121 may also serve as the card discharge opening through which the card CA is discharged, and the card CA that is introduced from the card introduction opening 121 may be conveyed forwards through the card conveyance path 125, conveyed rearwards, and then discharged from the card introduction opening 121. In this case, the card introduction opening 121 is not blocked by the tray 20 even at the state where the tray 20 is located at the close position. Also, since the area of the tray-side discharge opening 124 is not blocked by the tray 20, the card CA introduced from the card introduction opening 121 may be temporarily stopped at a state where the tip of the card protrudes from the tray-side discharge opening 124.

Also, the above configurations may be variously modified within the scope defined in the claims.

What is claimed is:

1. An image reading apparatus comprising:
    a housing including,
        a first introduction opening to which a first medium is configured to be introduced,
        a first conveyance path through which the first medium introduced from the first introduction opening is configured to be conveyed,
        a second introduction opening to which a second medium having a width narrower than that of the first medium is configured to be introduced, and
        a second conveyance path through which the second medium introduced from the second introduction opening is configured to be conveyed;
    a tray pivotally supported by the housing, being configured to rotate between an open position and a close position relative to the housing, and on which the first medium is configured to be placed;
    a shutter provided in the housing movably between a first position and a second position, the shutter being located at the first position when the tray is located at the open position and being located at the second position when the tray is located at the close position, the first position being located inside the second conveyance path and the second position being located outside the second conveyance path; and
    a reading unit provided inside the housing and being configured to read an image from the first medium that is conveyed through the first conveyance path and an image from the second medium that is conveyed through the second conveyance path.

2. The image reading apparatus according to claim 1, wherein the shutter includes:
    a contact part configured to contact with the tray at least when the tray is located at the close position; and
    a shutter shaft part extending in an axial direction, and wherein the shutter is provided in the housing pivotally about the shutter shaft part.

3. The image reading apparatus according to claim 2, wherein the tray includes,
    a tray shaft part extending in the axial direction;
    a tray body pivotal about the tray shaft part and extends from the tray shaft part to an outside of the housing, and
    a tray extension part extending to an inside of the housing, the tray extension part being configured to contact with the contact part when the tray is located at the close position.

4. The image reading apparatus according to claim 3, further comprising an urging member configured to urge the shutter from the second position towards the first position.

5. The image reading apparatus according to claim 3, wherein a tip of the contact part is arranged within a rotating range of the tray extension part.

6. The image reading apparatus according to claim 3, wherein one of the tray extension part and the shutter includes a long hole that elongates in an extension direction of the tray extension part, a depth direction of the long hole being parallel to the axial direction,
    wherein the contact part extends from the shutter shaft part, and
    wherein the other of the tray extension part and the shutter includes a connection shaft part that protrudes from the contact part in the axial direction and is inserted into the long hole.

7. The image reading apparatus according to claim 1, wherein the first conveyance path has a first portion overlapping with a part of the second conveyance path and a second portion being close to the first introduction opening with respect to the part of the second conveyance path overlapping with the first portion of the first conveyance path, and
    wherein the reading unit abuts the first portion.

8. The image reading apparatus according to claim 7, wherein the first portion of the first conveyance path extends in a first direction,
    wherein the second portion of the first conveyance path extends in a second direction which is different from the first direction, and
    wherein the entire second conveyance path extends in the first direction.

9. The image reading apparatus according to claim 8, wherein the shutter is provided between the second portion of the first conveyance path and the second conveyance path, and is closer to the second introduction opening with respect to the first portion.

10. The image reading apparatus according to claim 1, wherein the shutter is provided between the second introduction opening and the reading unit.

11. The image reading apparatus according to claim 1, further comprising a first conveyance roller and a second conveyance roller,
    wherein the second conveyance roller is configured to convey the second medium on the second conveyance path from one side in a conveyance direction towards another side in the conveyance direction,
    wherein the first conveyance roller is configured to convey the first medium from the one side of the conveyance direction towards the other side on the first conveyance path,
    wherein the other side-surface of the housing in the conveyance direction includes a first medium discharge opening configured to discharge the first medium therethrough,
    wherein the second introduction opening is formed to the one side-surface of the housing in the conveyance direction with respect to the second conveyance roller,
    wherein a rotating axis of the tray is orthogonal to the conveyance direction and is located at the one side of the housing in the conveyance direction with respect to the first conveyance roller,
    wherein the other side-surface of the housing in the conveyance direction includes a housing-side discharge opening configured to discharge the second medium introduced from the second introduction opening, and
    wherein the first medium discharge opening overlaps with a part of the housing-side discharge opening in an axial direction of the rotating axis of the tray.

12. The image reading apparatus according to claim 11,
wherein the tray includes a tray-side discharge opening that overlaps with the housing-side discharge opening in the conveyance direction when the tray is located at the close position, and
wherein the tray overlaps with an area of the first medium discharge opening other than an area of the first medium discharge opening that overlaps with the housing-side discharge opening in the conveyance direction when the tray is located at the close position.

13. The image reading apparatus according to claim 11, further comprising:
a first sensor configured to detect whether the tray is located at the open position or the close position,
a second sensor configured to detect an orientation of the image reading apparatus,
a display operation unit provided to an upper surface of the housing and configured to display information and receive an operation; and
a display control unit configured to control the display operation unit to:
display a guide image to rotate the orientation of the housing when the first sensor has detected that the tray is located at the close position, and
disappear the guide image when the second sensor has detected that the reading apparatus is rotated.

14. The image reading apparatus according to claim 1,
wherein the tray is configured to cover the housing at the close position.

15. The image reading apparatus according to claim 1,
wherein the tray is configured to expose the housing at the open position.

16. A conveyance apparatus comprising:
a housing including,
a first introduction opening to which a first medium is configured to be introduced,
a first conveyance path through which the first medium introduced from the first introduction opening is configured to be conveyed,
a second introduction opening to which a second medium having a width narrower than that of the first medium is configured to be introduced, and
a second conveyance path through which the second medium introduced from the second introduction opening is configured to be conveyed;
a tray pivotally supported by the housing, being configured to rotate between an open position and a close position relative to the housing, and on which the first medium is configured to be placed; and
a shutter provided in the housing movably between a first position and a second position, the shutter being located at the first position when the tray is located at the open position and being located at the second position when the tray is located at the close position, the first position being located inside the second conveyance path and the second position being located outside the second conveyance path.

17. An image reading apparatus comprising:
a housing including,
a first introduction opening to which a first medium is configured to be introduced,
a first conveyance path through which the first medium introduced from the first introduction opening is configured to be conveyed,
a second introduction opening to which a second medium having a width narrower than that of the first medium is configured to be introduced, and
a second conveyance path through which the second medium introduced from the second introduction opening is configured to be conveyed;
a tray configured to rotate between an open position and a close position relative to the housing and including,
a tray body configured to rotate about a tray shaft part extending in an axial direction, extending from the tray to an outside of the housing, and on which the first medium is configured to be placed, and
a tray extension part extending from the tray to an inside of the housing;
an elastic member;
a shutter provided to the housing so as to be rotatable about a shutter shaft part extending in the axial direction while being applied with an urging force by the elastic member in a direction along which the displacement part is displaced from the second position to the first position, the shutter including,
a contact part extending from the shutter shaft part extending in the axial direction, having a tip arranged within a rotating range of the tray extension part, and contacting with the tray when the tray is located at the close position, and
a displacement part extending from the shutter shaft part, being located at a position overlapping with the second introduction opening in a conveyance direction of the second medium when the shutter is located at a first position, and being located at a position deviating from the second introduction opening in the conveyance direction of the second medium when the shutter is located at a second position; and
a reading unit configured to read an image of the first medium that is conveyed through the first conveyance path and an image of the second medium that is conveyed through the second conveyance path.

* * * * *